United States Patent [19]
Sheffield

[11] 4,218,139
[45] Aug. 19, 1980

[54] SOLAR ENERGY DEVICE AND METHOD

[76] Inventor: Herman E. Sheffield, P.O. Box 19781, Houston, Tex. 77024

[21] Appl. No.: 912,534

[22] Filed: Jun. 5, 1978

[51] Int. Cl.² ............................................... G01J 1/42
[52] U.S. Cl. ................................................... 356/218
[58] Field of Search ............... 356/215, 218; 324/99 D

[56] References Cited

U.S. PATENT DOCUMENTS 4,015,116  3/1977  Bahm .............................. 356/215 X

OTHER PUBLICATIONS

R. M. Masters "Solar Energy Meter" National Aeronautics and Space Administration Report, TM-73791.
A. M. Bosschaert "Minivolt" Elektor, Nov. 1976, p. 11-32-3.

Primary Examiner—Rolf G. Hille

[57] ABSTRACT

A device and method are disclosed for measuring solar energy during a testing period which uses a cell to provide an electrical signal in response to received solar energy and a resistor connected to the cell for providing an adjusted electrical signal at a valve chosen to represent a specified value of solar energy. A pulse train is provided which has a reduced frequency proportional to the adjusted electrical signal, the number of pulses are counted and this accumulated number is displayed, the number being representative of the solar energy received by the cell during the testing period. Batteries are used to supply power to the device and a normally open switch activates the display which is normally inactive during the testing period to conserve the life of the battery.

5 Claims, 1 Drawing Figure

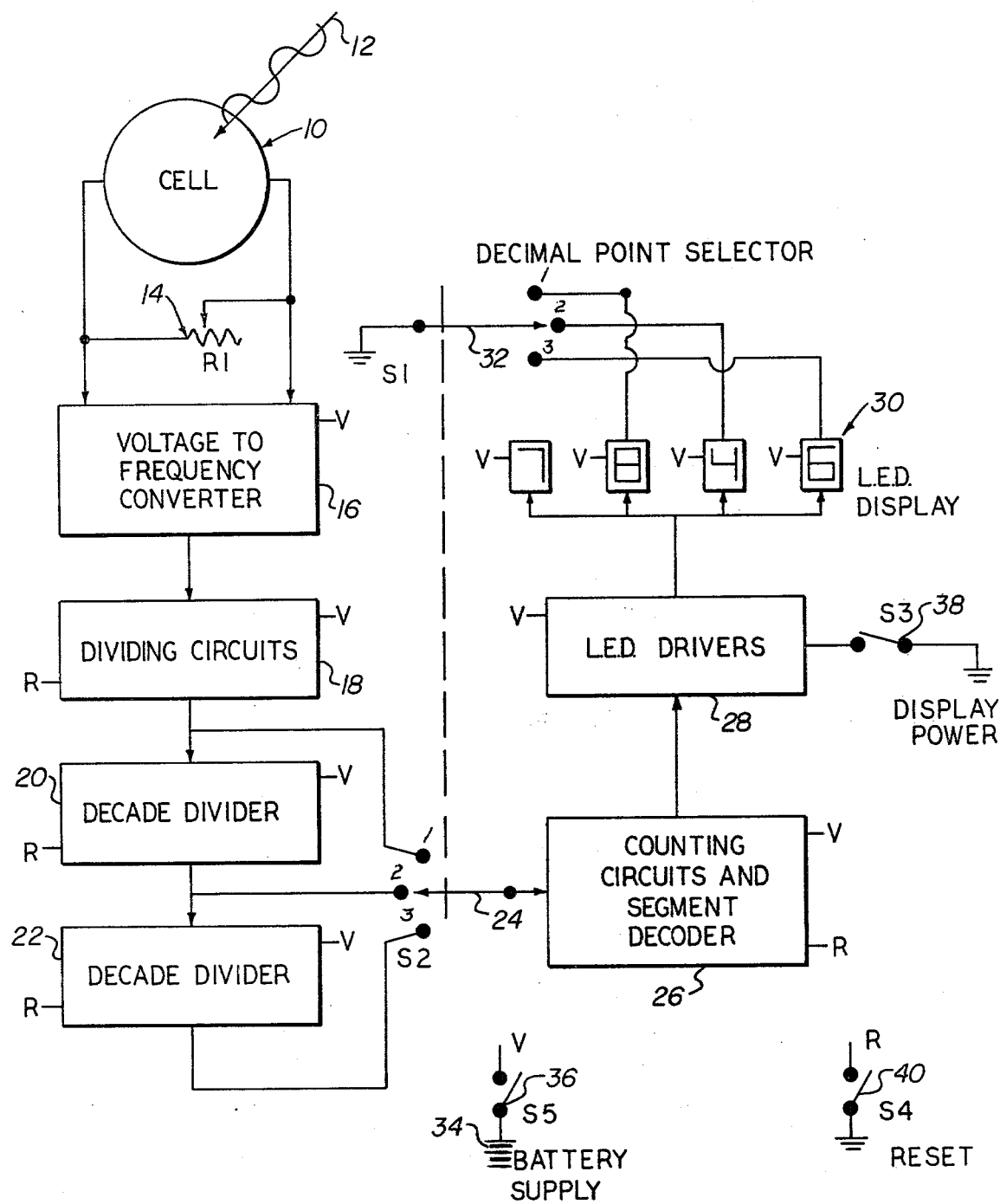

SOLAR ENERGY DEVICE AND METHOD

This invention relates to a device for and a method of measuring solar energy during a testing period.

Although hand-held pocket meters have been used to measure the solar energy or radiation at selected locations, there have been no devices which conveniently measures and sums the solar energy.

Accordingly, it is an object of the present invention to provide a device for and method of measuring solar energy during a testing period that sums the solar radiation falling on a surface area, storing this sum and recalling it on demand.

Further, it is an object of the present invention to provide a numerical readout of the amount of solar energy which is meaningful and relates to the equivalent hours of full solar insolation that has accumulated on this area.

Further, it is an object of the present invention to provide a means of adjusting or selecting the degree of resolution of the accumulated sum so as to permit use of the device over varying periods of time.

Further, it is an object of the present invention to provide a device that is usable over an extended period of time by using the power from a battery because of the possibility of commercial power interruption which would cause the loss of the stored sum in the memory circuits of the device.

Further, it is an object of the present invention to provide a device employing CMOS integrated circuits to further conserve the life of the battery.

Further, it is an object of the present invention to provide a device that responds rapidly to variations in the solar energy being received.

FIG. 1 shows a schematic illustration of a preferred embodiment constructed according to the present invention.

The device as shown includes a sensing cell 10, such as a silicon voltaic cell, which receives solar energy or radiation, as represented by arrow 12, on its surface. Cell 10 is positioned in the area in which the radiation is to be measured and provides an electrical signal in response to the received solar energy. A low value adjustable resistor 4 is shunted to cell 10 so that the current flowing in resistor 14 is directly proportional to the intensity of the solar radiation falling on the cell. Resistor 14 is then adjusted to provide a specific voltage for a specific value of solar radiation. For example, the resistor is adjusted to provide an output of 100 mv to correspond with an insolation of 100 mW/cm².

This voltage is then transmitted or carried to a voltage to frequency converter 16, which is a monolithic integrated circuit. An example of such a converter is manufactured by Analog Devices having model No. AD 537 JD which consumes 1.2 ma at 5 volts dc. The converter output is essentially a square voltage wave pulse train with the frequency being directly proportional to the input voltage and hence the intensity of the solar radiation.

The output of converter 16 is then fed to dividing circuits 18 where the frequency is divided and reduced. An example of such circuits are two seven-stage binary counters in series, such as Type CD 4024 A sold by RCA, which provides a frequency reduction of $2^{14}$. When using these circuits, the frequency output of converter 16 is adjusted to provide an output of 455.1 cycles per second so that an input of 100 mV or 100 vW/cm² produces a summed count after one hour of continuous input of approximately 100 ($455.1 \times 3600 \div 2^{14} = 100$).

Decade dividers 20 and 22 receive the output from circuits 18 for division by factors of 10 in order to obtain counts of 100, 10 or 1. An example of such decade counters are sold by RCA and have model No. CD 4026 AE.

To select the appropriate count for the testing period, a three position switch 24 is connected so that point 1 receives the output from dividing circuits 18, point 2 receives the output from divider 20 and point 3 receives the output from divider 22 and the output is carried through the blade of switch 24 to a counting and decoding circuits 26, such as provided by four model No. CD 4026 AE sold by RCA. Circuits 26 sum the pulses of the train and provide outputs for driving a seven-segment numerical display. These driving signal are fed through light emitting diode drivers 28 which amplify the output sufficiently to energize the light emitting diode (LED) display 30 having a capability of displaying four separate digits.

To provide the correct digital reference for the resolution selected by switch 24, a switch 32 is ganged to switch 24. Thus, when the blade of switch 24 is moved to either point 1, 2 or 3, the blade of switch 32 will correspondingly move to contact point 1, 2 or 3, which provides a decimal point at the appropriate location in the readout.

As shown, a battery 34 supplies the necessary power to the device and a switch 36 is closed to supply power to converter 16, dividing circuit 18, decade dividers 20 and 22, counting circuit and decoder 26, drivers 28 and display 30.

Since the display normally uses more power then the other circuits, a normally opened switch 38 leading to ground is provided to activate the displays. Since this switch is normally opened, the operator has to close the switch to activate the display and read the stored sum. This is done infrequently through the testing period to conserve the life of the battery. Further, all circuits are preferably selected for very low current drain and are of the COS/MOS type so that the instrument will consume less than 2 ma of current at 5 volts and can therefore be continuously operated for up to approximately 6 months with four 10 amp hour capacity "D" cells.

A switch 40 leading to ground is provided in the circuits 18, 20, 22 and 26 to reset the counters.

Since the intensity of full sun at air mass 1 is generally assumed to be 1 kw per square meter (100 mW/cm²), resistor 14 is sized and adjusted to provide a signal of 100 mV representing an insolation at 100 mW/cm². The voltage to frequency converter is then adjusted to give a signal of 455.1 counts per second corresponding to the 100 mW/cm² of solar intensity and circuits 18 and dividers 20 and 22 divide by $2^{14}$, $2^{14} \times 10$ or $2^{14} \times 100$, depending on the position of switch 24. Thus, an input of 1 kW per square meter for one hour or the integral of a variable input equal to 1 kW hour will be stored as 100, 10 or 1, depending on the switch position, and will be displayed as 1.00, 1.0 or 1.. A display of 1 is therefore simply equal to 1 kW hr. of solar input and since four figures can be displayed, the instrument can provide integrations of 9999, 999.9 or 99.99 depending on the position of switches 24 and 32. For a short term, a resolution to the nearest 1/100 would be used where the sum might be only for 1–2 kW hr. and a resolution of up to 9999 is used for long term integration, say for 6 months, the life of the "D" cells.

The invention having been described, what is claimed is:

1. A device for measuring solar energy during a testing period, comprising:
    a cell for providing an electrical signal in response to received solar energy;
    A resistor connected to the cell for providing an adjusted electrical signal at a value chosen to represent a specified value of solar energy;
    means for providing a pulse train with a frequency proportional to the adjusted electrical signal and for reducing the frequency to a number representing the amount of solar energy received by the cell;
    means for dividing said signals of said pulse train selective factors of 10 and selecting the resolution of the summed count;
    means for selectively accumulating a count of the number of divided pulses in the train over a selected period of time;
    means when activated for intermittently visually displaying the number of pulses counted which represents the solar energy received by the cell during the testing period;
    a battery for supplying power to the device; and
    a normally open switch for activating the displaying means which are normally inactive during the testing period to conserve the life of the battery.

2. The device as set forth in claim 1, wherein the display means includes a light emitting diode display for each digit to be shown, light emitting diode drivers for activating each display and seven segment decoders for activating the drivers in response to the counted pulses.

3. The device as set forth in claim 1, wherein said means for dividing said signals of said pulse train comprise:
    a plurality of decade divider circuits;
    counting and decoding circuit means for receving the output of said divider circuit means and summing the received pulses; and
    selector switch means for selectively connecting said counting and decoding circuit means with selected ones of said dividing circuits.

4. The device as set forth in claim 4, including:
    light emitting diode display circuits including driver circuits therefor receiving the output of said counting and decoding circuit; and
    means for selecting the decimal point position in said light emitting diode display circuits responsive to positioning of said selector switch means.

5. A method of measuring solar energy during a testing period, comprising:
    positioning a cell for receiving the solar energy at the location to be tested;
    converting the received solar energy into an electrical signal;
    adjusting the electrical signal in proportion to a specified electrical signal chosen to represent a specified value of solar energy;
    providing a pulse train with a frequency proportional to the adjusted electrical signal and having a frequency reduced to a number representing the amount of solar energy received by the cell;
    accumulating a count of the number of pulses in the train;
    selectively dividing the number of pulses into factors of ten and selecting the resolution of the summed count to permit use of the device over varying test periods;
    using a battery to supply power to the device; and
    intermittently displacing the number of pulses counted during the testing period to conserve the life of the battery, the displayed number representing the solar energy received during the testing period.

* * * * *

UNITED STATES PATENT AND TRADEMARK OFFICE
CERTIFICATE OF CORRECTION

PATENT NO. : 4,218,139

DATED : August 19, 1980

INVENTOR(S) : Herman E. Sheffield

It is certified that error appears in the above—identified patent and that said Letters Patent is hereby corrected as shown below:

On the title page add the following:

-- [73] Assignee: Robert J. Dodge, Houston, Texas --.

Signed and Sealed this

Twenty-fourth Day of February 1981

[SEAL]

Attest:

RENE D. TEGTMEYER

Attesting Officer    Acting Commissioner of Patents and Trademarks